United States Patent
Hewitt et al.

(10) Patent No.: US 9,508,160 B2
(45) Date of Patent: Nov. 29, 2016

(54) USER INTERFACE PANEL

(75) Inventors: Colin Hewitt, Letchworth Garden (GB); Scott M. Potter, Welwyn Garden (GB)

(73) Assignee: Xerox Corporation, Norwalk, CT (US)

( * ) Notice: Subject to any disclaimer, the term of this patent is extended or adjusted under 35 U.S.C. 154(b) by 1026 days.

(21) Appl. No.: 13/031,782

(22) Filed: Feb. 22, 2011

(65) Prior Publication Data
US 2012/0212510 A1    Aug. 23, 2012

(51) Int. Cl.
*G06T 11/00*    (2006.01)
*G06F 3/01*    (2006.01)

(52) U.S. Cl.
CPC .............. *G06T 11/00* (2013.01); *G06F 3/013* (2013.01)

(58) Field of Classification Search
CPC .. G06T 11/60; G06F 3/0481; G06F 3/04815; G06F 3/04845; G06F 2200/1614
See application file for complete search history.

(56) References Cited

U.S. PATENT DOCUMENTS

| | | | |
|---|---|---|---|
| 4,410,159 A | 10/1983 | McVicker | |
| 4,561,619 A | 12/1985 | Robillard | |
| 4,575,033 A | 3/1986 | Henneberg | |
| 4,659,048 A | 4/1987 | Fahrion | |
| 4,836,478 A | 6/1989 | Sweere | |
| 5,038,169 A | 8/1991 | Marincic | |
| 7,552,402 B2 | 6/2009 | Bilow | |
| 7,746,356 B2 * | 6/2010 | Meinders | 345/629 |
| 2006/0109242 A1 * | 5/2006 | Simpkins | 345/156 |
| 2008/0069397 A1 * | 3/2008 | Bartsch | 382/100 |
| 2008/0129819 A1 * | 6/2008 | Mark et al. | 348/51 |
| 2009/0028444 A1 * | 1/2009 | Hwang et al. | 382/224 |
| 2009/0109509 A1 * | 4/2009 | Yabe | 358/536 |
| 2009/0219244 A1 * | 9/2009 | Fletcher et al. | 345/102 |
| 2011/0032340 A1 * | 2/2011 | Redmann et al. | 348/51 |
| 2011/0316997 A1 * | 12/2011 | Shirbabadi | 348/78 |

* cited by examiner

*Primary Examiner* — Michelle Chin
(74) *Attorney, Agent, or Firm* — Fay Sharpe LLP

(57) ABSTRACT

The present disclosure provides a method of modifying a user interface on a display relative to a user, comprising: detecting a position of a user's eyes relative to a user interface (UI) viewing surface, wherein the detecting includes sensors selected from the group consisting of proximity sensors, web cams, and face recognition scanners; wherein the detecting further includes detecting the position of the user's eyes relative to the user interface; adjusting the UI's viewing surface for altered viewing based on the position of the user's eyes; and, wherein the adjusting comprises a software algorithm for switching on and off semi-transparent pixels in the UI viewing surface for viewing the UI by the user at a viewing angle from about 20 degrees to about 90 degrees.

16 Claims, 3 Drawing Sheets

USER INTERFACE PANEL

BACKGROUND

In today's digital world, the use of graphic user interfaces (GUIs) to display and manage information has become ubiquitous. For example, operating systems used in many personal computers, printers, copiers, electronic devices, etc., employ a graphic user interface (GUI) that displays information (e.g., text, images, etc.) for a user to view, and provides various icons or indicia with which the user may interact (e.g., a button, an Internet link, etc.). Software applications in these systems count on knowing, in advance, the typical position from which the user will be viewing the display screen, and will arrange and orient their graphical elements accordingly. For example, for a typical copier/printer, the applications assume that the user will be viewing the display at a typical viewing angle with one particular edge being at the "top," and will orient text and images with that orientation in mind.

New applications or displays opened on the system assume the same orientation for the display, and present their information aligned in the same manner as other applications (e.g., they share the same understanding of "up" and "down" and display angle as other applications on the system). This allows the same user to easily and accurately see the information for the various applications. However, such arrangements may include drawbacks.

BRIEF SUMMARY

In one aspect of the disclosure, a method of modifying a user interface on a display relative to a user is provided, comprising: detecting a position of a user's eyes relative to a user interface (UI) viewing surface, wherein the detecting includes sensors selected from the group consisting of proximity sensors, web cams, and face recognition scanners; wherein the detecting further includes detecting the position of the user's eyes relative to the user interface; adjusting the UI's viewing surface for altered viewing based on the position of the user's eyes; and, wherein the adjusting comprises a software algorithm for switching on and off semi-transparent pixels in the UI viewing surface for viewing the UI by the user at a viewing angle from about 20 degrees to about 90 degrees.

In another aspect of the disclosure, a method of modifying a user interface on a display relative to a user, comprising: detecting a position of a user's eyes relative to a user interface (UI) viewing surface, wherein the detecting includes sensors selected from the group consisting of proximity sensors, web cams, and face recognition scanner. The method further comprises: detecting the position of the users eyes relative to the user interface; adjusting the UI's viewing surface for altered viewing based on the position of the user's eyes, wherein the adjusting comprises a software algorithm for switching on and off semi-transparent pixels in the UI viewing surface for viewing the UI by the user at a viewing angle from about 20 degrees to about 90 degrees; and, a series of polarizing films wherein the algorithm determines which polarizing films to activate to alter the UI display based on the position of the user.

In yet another aspect of the disclosure, an apparatus is provided for modifying a user interface on a display relative to a user, comprising: a sensor for detecting a position of a user relative to a user interface (UI) viewing surface; wherein the sensor is selected from the group consisting of proximity sensors, web cams, and face recognition scanners; and, wherein the detecting includes detecting the position of a user's eyes relative to the user interface. The apparatus further comprises: a software algorithm for switching on and off semi-transparent pixels in the UI viewing surface for adjusting the UI's viewing surface for viewing the UI by the user at a viewing angle from about 20 degrees to about 90 degrees; and, a series of polarizing films wherein the algorithm determines which polarizing films to activate to further adjust the UI display based on the position of the user.

In still a further aspect of the invention, a method is provided for orienting a user interface on a display to a user, comprising: detecting a position of a user's eyes relative to a user interface (UI) viewing surface, wherein the detecting includes sensors selected from the group consisting of proximity sensors, web cams, and face recognition scanners; and, wherein the detecting further includes detecting the position of the user's eyes relative to the user interface. The method further comprises: adjusting the UI's viewing surface for optimal viewing based on the position of the user's eyes; and, wherein the adjusting comprises a software algorithm for switching on and off semi-transparent pixels in the UI viewing surface for viewing the UI by the user at a viewing angle from about 20 degrees to about 90 degrees.

Yet further, a method of modifying a user interface on a display relative to a user is provided, comprising: detecting a position of a user's eyes relative to a user interface (UI) viewing surface; wherein the detecting includes sensors selected from the group consisting of proximity sensors, web cams, and face recognition scanner; and, wherein the detecting includes detecting the position of the users eyes relative to the user interface. The method further comprises: adjusting the UI's viewing surface for altered viewing based on the position of the user's eyes; wherein the adjusting comprises a software algorithm for switching on and off semi-transparent pixels in the UI viewing surface for viewing the UI by the user at a viewing angle from about 20 degrees to about 90 degrees; and, a series of polarizing films wherein the algorithm determines which polarizing films to activate to alter the UI display based on the position of the user.

And still further, an apparatus for modifying a user interface on a display relative to a user is provided, comprising: a sensor for detecting a position of a user relative to a user interface (UI) viewing surface; wherein the sensor is selected from the group consisting of proximity sensors, web cams, and face recognition scanners; and, wherein the detecting includes detecting the position of a user's eyes relative to the user interface. The apparatus further comprises: a software algorithm for switching on and off semi-transparent pixels in the UI viewing surface for adjusting the UI's viewing surface for viewing the UI by the user at a viewing angle from about 20 degrees to about 90 degrees; and, a series of polarizing films wherein the algorithm determines which polarizing films to activate to further adjust the UI display based on the position of the user.

BRIEF DESCRIPTION OF THE DRAWINGS

Various of the above-mentioned and further features and advantages will be apparent from the specific apparatus and its operation described in the example(s) below, as well as the claims. Thus the present disclosure will be better understood from this description of an embodiment thereof, including the drawing figures wherein:

DETAILED DESCRIPTION

Figure 1:
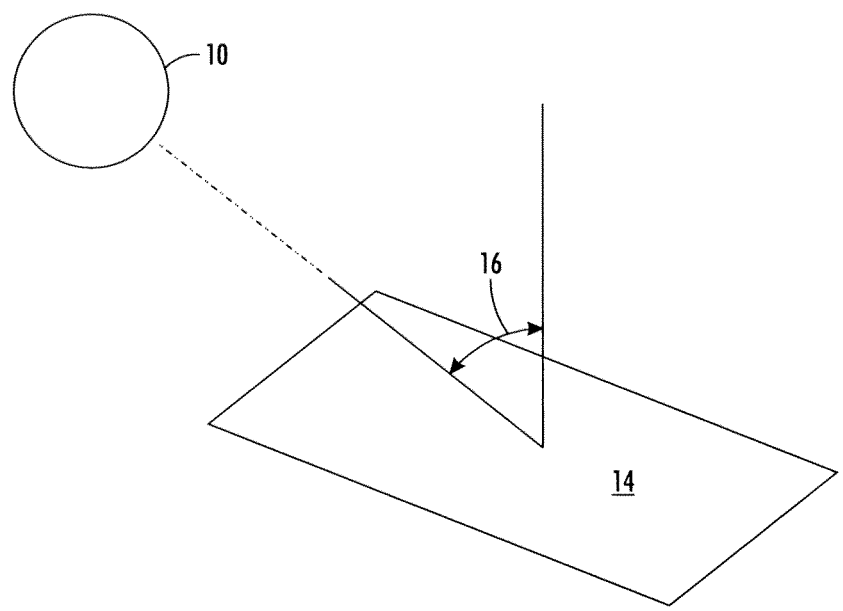
FIG. 1 is a schematic view of a user's viewing position, including a viewing angle, relative to a display (i.e. a flat panel LCD display)

The present disclosure relates to a printer apparatus or the like, and more particularly, to a reconfigurable Graphical User Interface (GUI) for interfacing with such a printer or other GUI.

An interactive user interface display and controller UIT using a cathode ray tube (CRT) or other technology provides, through the associated software, a substantially flexible, operable, and extensive interface to the user of complex equipment, such as printers, duplicators, computers and computer controlled machines. However, a problem with the use of interactive displays is that the usual horizontal display requires a user to view the horizontal display nearly directly overhead.

Prior attempts at improving displays for a viewer include U.S. Pat. No. 4,410,159 that shows an adjustable support for a display terminal providing a tilt of forty degrees and an infinite angle of swivel adjustment. In U.S. Pat. No. 4,561,619, a system for supporting and moving a CRT monitor on a horizontal surface is disclosed wherein the support is on rollers. The supporting means preferably also includes means for tilting and swiveling the monitor. U.S. Pat. No. 4,575,033, discloses a tilt-swivel base for a CRT terminal allowing the monitor to be rotated, swiveled and tilted readily. A semi-circular rocker drum is mounted on the underside of the terminal. The rocker drum is supported by a cradle which is inserted in a recess on a horizontal surface. The length of the recess is made longer than the length of the cradle thereby enabling the cradle to slide from side to side. A supporting device is shown in U.S. Pat. No. 4,659,048, for a data displaying unit, which is rotatable about a vertical axis and displaceable in a horizontal plane, allowing the distance between the eye and the display unit to be set for the viewing direction chosen by the operator. U.S. Pat. No. 4,836,478, discloses a suspension system for a monitor which allows rotation of the monitor around its vertical axis, and pivoting and tilting of the monitor. The monitor may also be moved laterally. These patents do not answer the problems heretofore mentioned with respect to displaying a GUI using manipulated pixels, polarizing films, and/or display angles to improve the readability of the horizontal, or nearly horizontal, GUI to the user.

Mechanical arms may address these problems through the use of a single display, but have inherent problems. Single arm supported displays may be limited in their ability to achieve ergonomically optimal placement as the display tracks on an arc of a circle. Articulated arms employing multiple pivot points, four bar linkages and the like can achieve great flexibility in display placement, but require precision parts and high strength to handle larger, heavier displays without appreciable wobble. Mechanical arms appear to use space that could be otherwise productive within the system or through less space for installation of the system. The swing arm mechanism and the heavy swinging object presents operator hazards and added component costs.

Existing products typically have a UI (User Interface) that is set at a fixed angle of presentation to the user. This means that the user must optimally position themselves in the same place in order to view the screen. The position is dependent on various attributes relating to the user (e.g., height) and, in some instances, creates problems for the user, specifically those with some form of disability or medical problem (i.e. neck related problems). Referring to FIG. 1, there is shown a user's viewing position 10 relative to an LCD flat panel display 14. A viewing angle is formed therebetween 16. Allowing the user to vary the viewing angle of the screen and/or varying the viewing display relative to the user, creates a better user experience.

Many office products, i.e. copiers and printers, have a UI that is in the same plane as the platen glass and, therefore, requires the user to position themselves such that their head is directly over (i.e. 90 degrees) the UI screen. This can be both restrictive and uncomfortable for many users. Furthermore, such limited viewing angles hinders use by people with disabilities such as those in wheelchairs. It is to be appreciated that as the viewing angle 16 increases, the display becomes less and less readable. To be described in more detail hereinafter, increasing or adjusting the brightness of sub-rendered or semi-transparent pixels can be implemented to counter the degradation of the display relative to the viewing angle.

The UI position is dependent on various attributes relating to both the user, for example, their height, and the display hardware such as the specifics of the RGB sub-pixels in LCD and TFT devices. Allowing the user to optimally view the UI content through a wide range of angles creates a better user experience while more successfully addressing the question of accessibility than solutions heretofore developed.

Accordingly, disclosed herein is a printer for printing copy sheets that includes a reconfigurable GUI for controlling its functions. The present disclosure, to be described in more detail hereinafter, proposes methods that automatically adjust an MFD user interface (UI) according to the viewing angle 16. Many MFD products that have a UI that is in the same plane as the platen glass have a narrow useful viewing angle 16. The present disclosure proposes to automatically detect the user position 10, using methods such as proximity sensors and a camera, and adjust the UI accordingly. The adjustments can be associated with: 1) using an electro-mechanical tilting mechanism to change the UI surface angle; 2) varying a viewing angle using polarizing films; and/or, 3) optimizing rendering parameters in software, e.g., making gray pixels either full black or full white.

The cost of a camera and panel tilting or polarizer control would likely exceed that of a better LCD panel with a larger viewing angle, but the rendering software variant according to adjustment (3) of this disclosure can be useful in architectures where a camera is needed for some other purpose. It is to be appreciated that various rendering parameter changes can be implemented beyond merely font changes described in the present disclosure. For example, the image could be stretched vertically to accommodate a steeper viewing angle (like markings on the surface of a roadway). In addition, other applications of the present disclosure can include such devices as laptops and cell phones.

As introduced above, the user can be provided with the ability to adjust the display of the UI screen. This can be done in several different ways either singularly or in combination, for example: mechanically, i.e. an electromechanical tilt mechanism; electronically, i.e. polarizing films; and/or, through software, i.e. changing the color palette, contrast, backlight, graphics transparency layers, etc., to compensate for the hardware emissivity characteristics (and reflective properties) throughout the full range of various viewing angles.

This disclosure does not limit the methods for detecting the user's position relative to the UI, but rather provides for a means to bring two or more separate technologies together. There are several exemplary methods known for sensing the position of the user, such as those employing simple proximity sensors to those which employ web cams and face recognition software to detect exactly where the user's eyes are in relation to the UI.

In one adjusting method, a tilt mechanism solution can include the angle of the UI's viewing surface being adjusted for optimal viewing based on sensing the position of the user. A software algorithm can control an electromechanical tilting mechanism that the UI is seated on. The electromechanical tilt mechanism can move or tilt the viewing surface to provide for a nearly perpendicular orientation relative to the user's line of sight.

In another adjusting method, an electronic technology solution can include varying the optimal viewing plane of a display. Polarising films are one example of how viewing angles can be adjusted in a dynamic arrangement. By adopting a software algorithm for determining which polarizing film (for example) should be active and then activating it based on the position of the user, the user does not have to position themselves in the optimal position determined by the mounting.

Figure 2A:
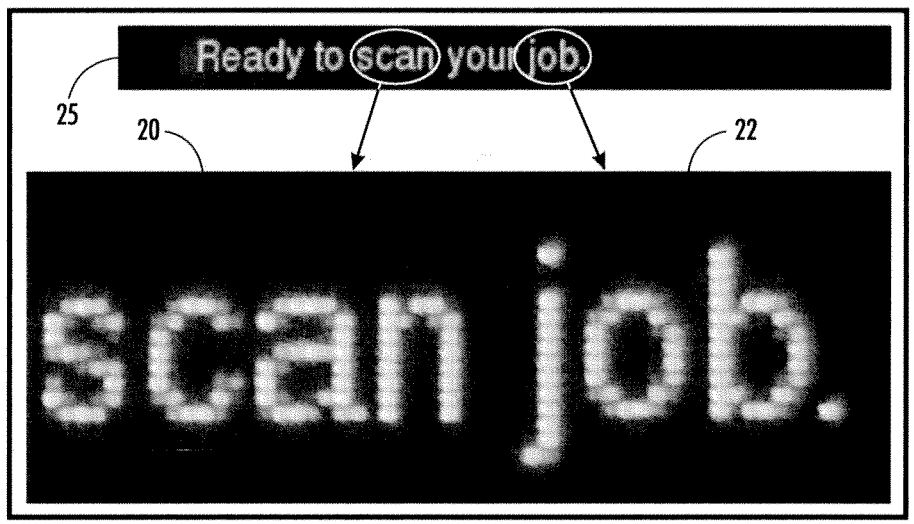
FIGS. 2A and 2B show a comparison of a typical LCD display at generally 90 degrees (2A), and at a typical user's position (2B); and, FIGS. 3A and 3B show a comparison of a pixel adjusted LCD display at generally 90 degrees (3A), and at a typical user's position (3B).
Figure 2B:
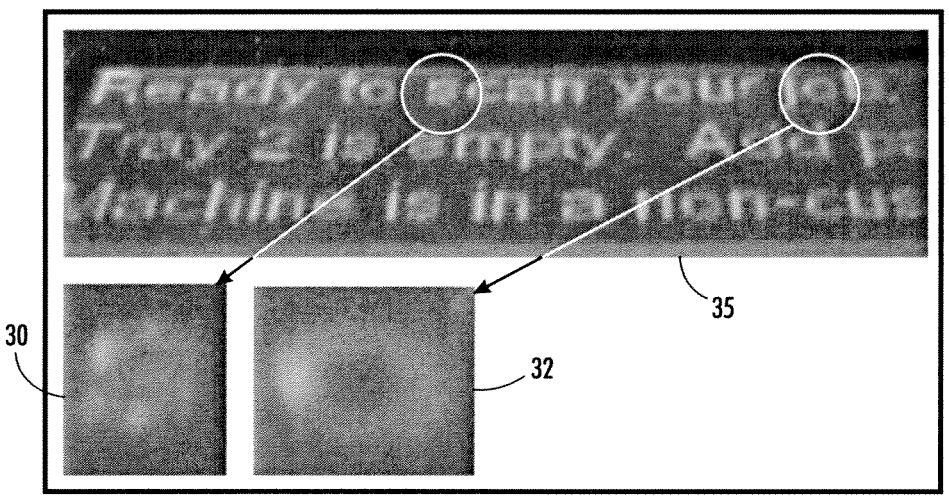

In yet another adjusting method, a software solution can include changes to the display such as 'anti-aliasing'. This type of change to the display is used to smooth fonts which can be severely adversely affected by the hardware characteristics. Typically in the case of a touch screen UI, the contrast and brightness rapidly degenerates as the viewing angle moves away from 90 degrees (FIGS. 2A and 2B). Semi transparent pixels that appear on the 90 degree plane (2A) completely disappear when viewed on another plane (2B). As shown in FIG. 2A, font characters 20, 22 appear well defined when viewed at 90 degrees 25. As shown in FIG. 2B, the same characters 30, 32, when viewed at a less than 90 degree angle 35, appear less defined. Anti-aliased pixels within characters 30, 32 disappear when viewed from a typical user's position and the font characters break down (i.e. are not fully readable). To overcome the aforementioned problem, one embodiment provides for a simple algorithm to turn on some of the semi-transparent pixels. The basic concept provides for the switching on of pixels that are being used in anti-aliasing. The brightness threshold that the pixel must be above before being switched fully on reduces as the viewing angle increases. This relationship is typically specific to the associated LCD hardware being used.

Figure 3A:
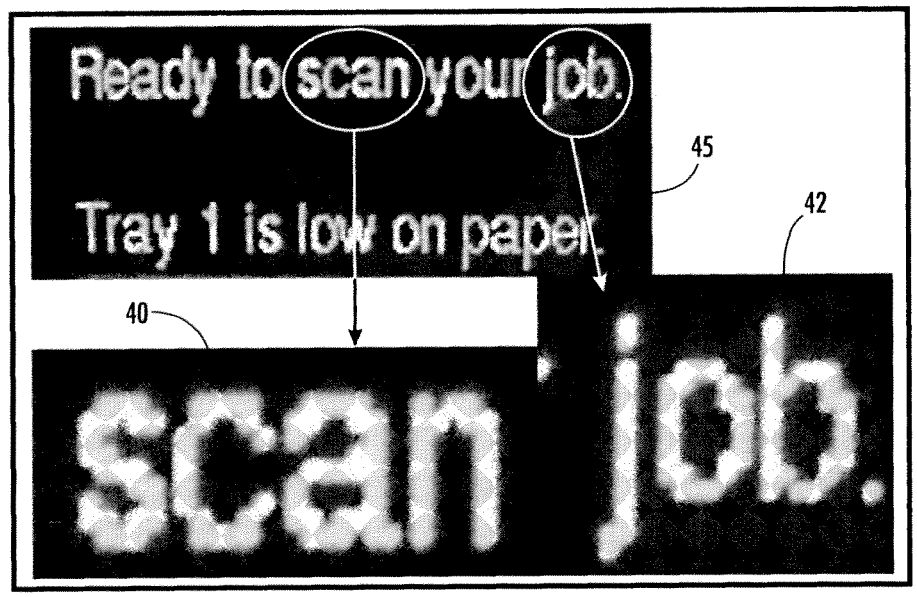
Figure 3B:
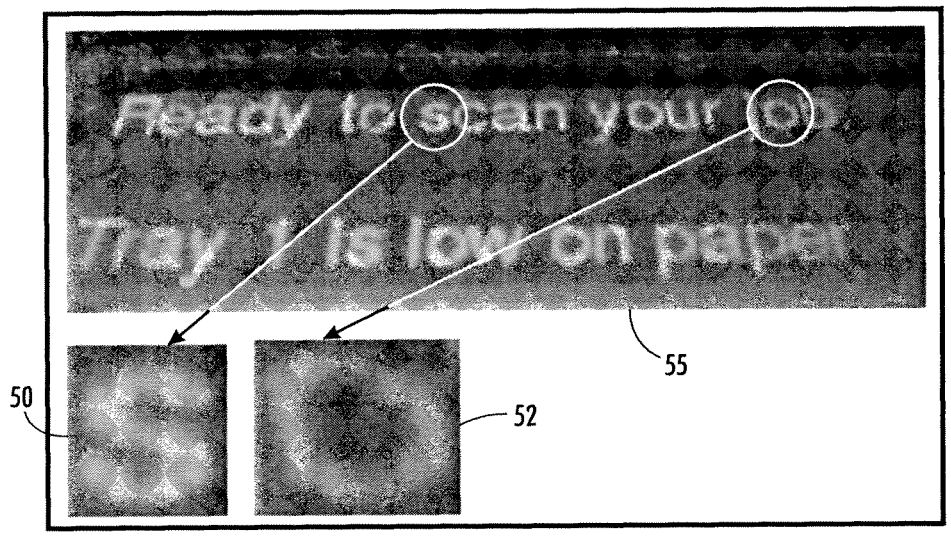

In another embodiment, a sub-pixel rendering algorithm can be implemented without user position detection. For example, with sub-pixel rendering switched off and selected pixels switched on, the display is readable at 90 degrees (FIG. 3A) and also readable at less than 90 degrees (FIG. 3B). As shown in FIG. 3A, font characters 40, 42 appear well defined when viewed at 90 degrees 45. As shown in FIG. 3B, the same characters 50, 52, when viewed at a less than 90 degree angle 55, maintain a defined appearance.

By adjusting the threshold that the semi transparent pixels are switched fully on or fully off, the font can again become readable at extreme angles. However, when viewed at 90 degrees, the font is very 'blocky', pixilated and difficult to read. A usable threshold can be ascertained to accommodate extreme viewing positions. By just adjusting the aforementioned threshold alone, based on the user's position, one can significantly improve the display and thus the viewing experience. The adjustment also reduces the effect of glare because the contrast remains optimal and thus allows the eyes to focus on a specific spot on the UI and not on the glare image. Two example algorithms or adjustments are as follows:

1) Pixel enablement threshold=128*—degrees from normal; and,
2) Backlight co-effic.=128*—degrees from normal.

Some of the aforementioned principles can be extended in a manner to variably and dynamically adjust values that were previously constants in rendering areas such as changing the color palette, contrast, backlight, graphics transparency layers, etc.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method of modifying a user interface on a display relative to a user, comprising:
   detecting a position of a user's eyes relative to a user interface (UI) viewing surface;
   wherein said detecting includes sensors selected from the group consisting of proximity sensors, web cams, and face recognition scanners;
   wherein said detecting further includes detecting said position of said user's eyes relative to said user interface;
   adjusting said UI viewing surface for altered viewing based on said position of said user's eyes;
   wherein said adjusting comprises a software algorithm for switching on and off semi-transparent pixels in the UI viewing surface for viewing said UI viewing surface by said user at a viewing angle;
   wherein said UI viewing surface is initially in a substantially horizontal plane, wherein said horizontal plane is generally parallel to a floor and wherein said pixels are adjusted automatically based upon said position of said user's eyes; wherein said viewing angle is formed between a user's viewing position, said UI viewing surface, and a plane orthogonal to said UI viewing surface; and,
   wherein said viewing angle decreases as said user approaches said UI viewing surface.

2. The method of claim 1, further comprising:
   a software algorithm and polarizing films wherein said algorithm determines which polarizing films to activate to alter said UI display based on said position of said user's eyes.

3. The method of claim 1, wherein said adjusting is done dynamically as said user's position changes.

4. The method of claim 1, further comprising adjusting an angle of said UI's viewing surface for optimal viewing based on said position of said user's eyes.

5. The method of claim 4, further comprising a software algorithm for controlling an electromechanical tilting mechanism for adjusting said angle of said UI's viewing surface.

6. The method of claim 4, further comprising a software algorithm for controlling an electromechanical tilting mechanism for adjusting said angle of said LA's viewing surface.

7. The method of claim 2, further comprising a software algorithm for switching on and off semi-transparent pixels in the UI viewing surface for viewing said UI by said user, wherein said UI viewing surface is horizontal and wherein said pixels are adjusted automatically based upon said position of said user's eyes.

8. The method of claim 7, wherein said adjusting is done dynamically as said user's position changes.

9. A method of modifying a user interface on a display relative to a user, comprising:
   detecting a position of a user's eyes relative to a user interface (UI) viewing surface;
   wherein said detecting includes sensors selected from the group consisting of proximity sensors, web cams, and face recognition scanner;
   wherein said detecting includes detecting said position of said users eyes relative to said user interface;
   adjusting said UI viewing surface for altered viewing based on said position of said user's eyes;
   wherein said adjusting comprises a software algorithm for switching on and off semi-transparent pixels in the UI viewing surface for viewing said UI viewing surface by said user at a viewing angle;
   a series of polarizing films wherein said algorithm determines which polarizing films to activate to alter said UI viewing surface display based on the position of said user;
   wherein said UI viewing surface is initially in a substantially horizontal plane, wherein said horizontal plane is generally parallel to a floor;
   wherein said viewing angle is formed between a user's viewing position, said UI viewing surface, and a plane orthogonal to said UI viewing surface; and,
   wherein said viewing angle decreases as said user approaches said UI viewing surface.

10. The method of claim 9, wherein said pixels are semi transparent pixels and are adjusted automatically based upon said user's position wherein said adjusting includes determining a threshold where said transparent pixels are switched fully on or fully off.

11. The method of claim 10, wherein said pixels are adjusted automatically based upon said position of said user's eyes.

12. The method of claim 11, wherein said adjusting is done dynamically as said user's position changes.

13. The method of claim 12, wherein said threshold is based on said position of said user's eyes.

14. The method of claim 13, further comprising a software algorithm for controlling an electromechanical tilting mechanism for adjusting said angle of said UI's viewing surface.

15. The method of claim 9, wherein said adjusting comprises adjusting values from the group consisting of color palette, contrast, backlight, and graphic transparency layers.

16. A method of orienting a user interface on a display to a user, comprising:
   detecting a position of a user's eyes relative to a user interface (UI) viewing surface;
   wherein said UI viewing surface is initially in a substantially horizontal plane, wherein said horizontal plane is generally parallel to a floor;
   wherein said detecting includes sensors selected from the group consisting of proximity sensors, web cams, and face recognition scanners;
   wherein said detecting further includes detecting said position of said user's eyes relative to said user interface;
   adjusting said UI viewing surface for optimal viewing based on said position of said user's eyes;
   wherein said adjusting comprises a software algorithm for switching on and off semi-transparent pixels in the UI viewing surface for viewing said UI viewing surface by said user at a viewing angle from about 20 degrees to about 90 degrees;
   wherein said viewing angle is formed between a user's viewing position, said UI viewing surface, and a plane orthogonal to said UI viewing surface; and,
   wherein said viewing angle decreases as said user approaches said UI viewing surface.

* * * * *